US010570876B1

(12) United States Patent
Ruffa

(10) Patent No.: US 10,570,876 B1
(45) Date of Patent: Feb. 25, 2020

(54) RESONANT WAVE ENERGY HARVESTING DEVICE

(71) Applicant: The United States of America as represented by the Secretary of the Navy, Newport, RI (US)

(72) Inventor: Anthony A Ruffa, Hope Valley, RI (US)

(73) Assignee: The United States of America as represented by the Secretary of the Navy

( * ) Notice: Subject to any disclaimer, the term of this patent is extended or adjusted under 35 U.S.C. 154(b) by 13 days.

(21) Appl. No.: 16/026,138

(22) Filed: Jul. 3, 2018

(51) Int. Cl.
*F03B 13/20* (2006.01)

(52) U.S. Cl.
CPC .................. *F03B 13/20* (2013.01)

(58) Field of Classification Search
CPC ...................................................... F03B 13/20
USPC .................. 290/1 R, 40 E, 42, 43, 45, 54
See application file for complete search history.

(56) References Cited

U.S. PATENT DOCUMENTS

| 7,443,046 B2* | 10/2008 | Stewart | F03B 13/20 290/42 |
| 2011/0089689 A1* | 4/2011 | Gregory | F03B 13/20 290/42 |
| 2011/0187101 A1* | 8/2011 | Beane | F03B 13/20 290/42 |
| 2014/0084586 A1* | 3/2014 | Henwood | F03B 13/20 290/42 |
| 2015/0188390 A1* | 7/2015 | Chiu | H02K 7/1892 290/1 C |

FOREIGN PATENT DOCUMENTS

GB         2535490 A  *  8/2016  ............ F03B 13/144

* cited by examiner

*Primary Examiner* — Charles Reid, Jr.
(74) *Attorney, Agent, or Firm* — James M. Kasischke; Michael P. Stanley

(57) ABSTRACT

An energy harvesting pendulum device is provided to oscillate in a semi-circular path on an inclined plane with a low friction surface in response to wave motion of an ocean surface. An electrical production source is mounted to an underside of the plane to convert kinetic energy of a pendulum bob of the pendulum device into electrical energy. The pendulum device can be enclosed by an enclosure floating on the ocean surface with the pendulum moving bob on the inclined plane within the enclosure. The length of the pendulum and the angle of the inclined plane are determined so that the pendulum operates in a resonant state at the ocean motion frequency. The pendulum bob can include rollers for minimal friction when contacting the inclined plane.

5 Claims, 3 Drawing Sheets

RESONANT WAVE ENERGY HARVESTING DEVICE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is a compact wave energy harvesting device that resonates at frequencies associated with ocean surface wave energy.

(2) Description of the Prior Art

An ocean wave energy harvesting device would be noticeably more effective if the harvesting device could operate at resonance. In the absence of external forces, an ideal spring-mass system (e.g., without any losses) can be modeled by the following equation: $m\ddot{x}(t)+kx(t)=0$, where m and k are the effective mass and stiffness of the system. For harmonic motion, $x(t)=x_0 e^{i\omega t}$, which leads to $-m\omega^2+k=0$ or $$\omega^2 = \frac{k}{m};$$

resonance is defined as an operation at that frequency $$\left(\text{i.e., } f = \frac{\omega}{2\pi} = \sqrt{\frac{k}{m}}\right).$$

The forces induced by the wave motion generate oscillations having much greater amplitudes due to the efficient storage and the transfer of potential energy to kinetic energy and with a transfer in the opposite direction. As a result, the wave energy absorbed by the energy harvesting device would be maximized.

However, a typical frequency associated with significant ocean wave energy is 0.2 Hz. It is difficult to build a conventional mechanical system that could resonate at such a low frequency and would be a compact device.

To illustrate this situation, a spring mass system is a mechanical device with a resonant frequency $$f = \frac{1}{2\pi}\sqrt{\frac{k}{m}}$$

where k and m are the effective stiffness and mass of the system. For $$f = 0.2 \text{ Hz}, \frac{k}{m} = 1.579,$$

this represents a very large system. For example, the static deflection of the spring element would be $$\Delta x = \frac{mg}{k} = 20.383 \text{ feet}.$$

feet. In addition, the mass and spring elements for low-frequency spring mass systems tend to be very large.

A pendulum represents another mechanical device that supports ocean wave energy harvesting. The resonant frequency of a pendulum is $$f = \frac{1}{2\pi}\sqrt{\frac{g}{L}}$$

where L is the pendulum length (the distance from the pivoting end or attachment point of the pendulum to the pendulum bob) in meters and $g=9.81$ m/s$^2$. For $$f = 0.22 \text{ Hz}, \frac{g}{L} = 1.579,$$

so that $$L = \frac{g}{1.579} = 20.383 \text{ feet}.$$

feet. Note that this is the same length as a spring-mass system for that resonant frequency.

A device in water would have a slightly smaller length scale because of the added mass resulting from the acceleration of the device in water. For example, a sphere accelerating in water has added mass $m_a$ that is one half of the displaced mass of the water so that an underwater spring mass system would have a resonant frequency in water of $$f_w = \frac{1}{2\pi}\sqrt{\frac{k}{m+m_a}}.$$

An underwater pendulum with a spherical bob would have a resonant frequency of $$f_w = f_a\sqrt{\frac{\rho_b - \rho}{\rho_b + \rho/2}},$$

where $f_a$ and $f_w$ are the resonant frequencies of the pendulum, respectively in air and water, $\rho_b$ is the density of the pendulum bob and p is the density of water.

SUMMARY OF THE INVENTION

Accordingly, it is a general purpose and primary object of the present invention to provide a compact energy harvesting system based on the motion of a pendulum.

The present invention is a pendulum constrained to oscillate in a semi-circular path on a low friction inclined plane. The length of the pendulum and the angle of the inclined plane are determined so that the pendulum operates in a resonant state at an ocean wave frequency. An electrical production source is mounted to an underside of the inclined plane to convert kinetic energy of the pendulum into electrical energy.

A variant of the present invention is an enclosure floating on the ocean surface with the pendulum moving on the inclined plane within the enclosure. The pendulum oscillates or moves in at least two directions in response to wave motion impacting the enclosure.

Another variant of the present invention is a pendulum with a pendulum bob having Teflon rollers to contact an inclined plane with a Teflon surface. The mass of the pendulum bob can be adjusted to optimize the friction force with the optimization generally being the reduction of friction.

An advantage of the pendulum of the present invention is the potential to resonate at a low frequency in a relatively small package. The resonant frequency of the pendulum moving on the inclined plane will be lower than a similar pendulum moving in a vertical plane.

BRIEF DESCRIPTION OF THE DRAWINGS

Other objects, features and advantages of the present invention will be better understood by means of a detailed description of the drawings that illustrate the principals of the present invention in which.

DETAILED DESCRIPTION OF THE INVENTION

Figure 1:
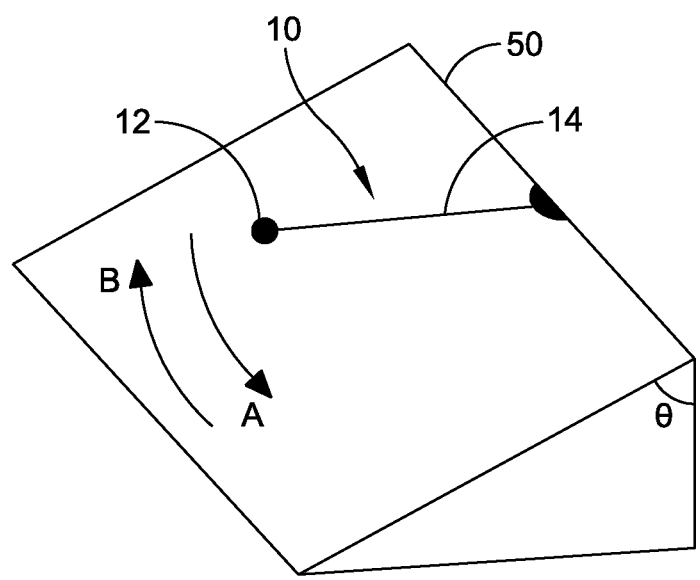
FIG. 1 depicts a pendulum of the present invention with movement directions on an inclined plane with the movement confined to a range of motion delineated by a reference line.

Referring now to the drawings, and more particularly to FIG. 1, a pendulum 10 of the present invention is depicted in which the pendulum is constrained to oscillate or move in directions in a semi-circular path "A" and a semi-circular path "B" on an inclined plane 50. When the pendulum 10 is above the inclined plane 50; a hinge and an extension from the plane can be added with an attachment point for the pendulum to allow for the pivoting action or range of motion.

The inclined plane 50 preferably has a Teflon surface; however, stainless steel, Nylon or Delrin can be used for the surface. Because of operating conditions in a saltwater environment, the pendulum 10 is preferably stainless steel, galvanized steel, or aluminum.

The resonant frequency of the pendulum 10 moving on the inclined plane 50 will be lower than a similar pendulum moving in a vertical plane. If the surface is not flat, the regions of curvature on the surface would lead to variations in the speed along the paths A and B, so that the pendulum 10 would not be in a resonant state. However, if the curvature in those regions is small, the variations to the resonant motion will also be small.

There is no preferred speed for the pendulum 10; however, there is a preferred range of motion. The maximum angle $\varphi_{max}$ along the path A or B should be thirty degrees or less to ensure that the motion of the pendulum 10 is well approximated by linear dynamics. Larger angles introduce nonlinearities that would alter the resonant frequency.

The angle $\varphi$ is defined as follows: when a pendulum bob 12 of the pendulum 10 is at a lowest position on the plane, then $\varphi=0$. For any other position of the pendulum bob 12, the angle in radians is defined as $\varphi=\tan^{-1}d/L$, where d is the perpendicular distance of the pendulum bob on the inclined plane 50 from the position of a pendulum rod 14 when $\varphi=0$.

The pendulum 10 moving on the inclined plane 50 at an angle of $\theta$ with respect to the vertical direction will have a resonant frequency of $$f = \frac{1}{2\pi}\sqrt{\frac{g\cos\theta}{L}}.$$

This manner of movement enables a smaller resonant device because L can be specified by computing the required value of $\theta$. For example, when L=2 meters and $\theta$=71.2 degrees. When L=1 meter and $\theta$=80.7 degrees. The energy production of the pendulum 10 depends on the nature of the magnetic field, the speed of the pendulum bob 12, and the size (not weight) of the conductor (i.e., the pendulum bob).

Figure 2:
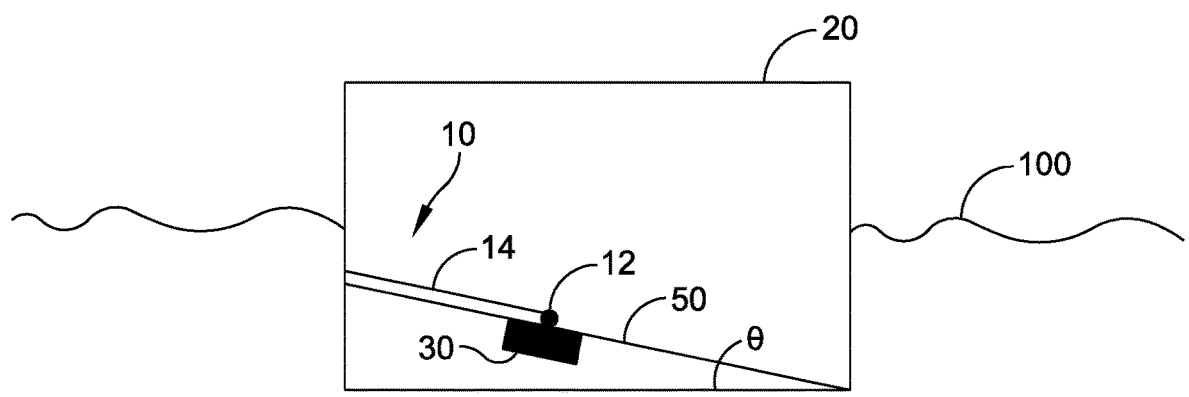
FIG. 2 depicts the pendulum of the present invention within an enclosure in which the enclosure and pendulum respond to wave movement of an ocean surface.

FIG. 2 depicts an embodiment of the invention with an enclosure 20 floating on the ocean surface 100 with the pendulum 14 moving on the inclined plane 50 within the enclosure. The pendulum rod 14 can either be attached to the wall of the enclosure 20 or to a structure mounted on the inclined plane 50. For use in an ocean environment, the enclosure 20 is preferably stainless steel, galvanized steel, or aluminum.

The pendulum 10 moves or oscillates in at least two directions in response to wave motion impacting the enclosure 20. An electrical production source 30 is mounted to an underside of the inclined plane 50 to convert kinetic energy of the pendulum 10 into electrical energy. For example: the electrical production source 30 can be a coil of wire producing a magnetic field that the pendulum 10 moves thru with the use of the pendulum bob 12 as an electrical conductor.

The pendulum bob 12 is preferably Teflon-coated. Although Teflon is an insulator; the pendulum bob 12 is a conductor such that the motion of the pendulum bob through the magnetic field induces an electric current. The generating current is induction, so current will be produced even if the pendulum bob 12 is coated. The length of the pendulum 10 and the angle $\theta$ of the inclined plane 50 are determined so that the pendulum operates in a resonant state at the ocean wave frequency.

Figure 3:
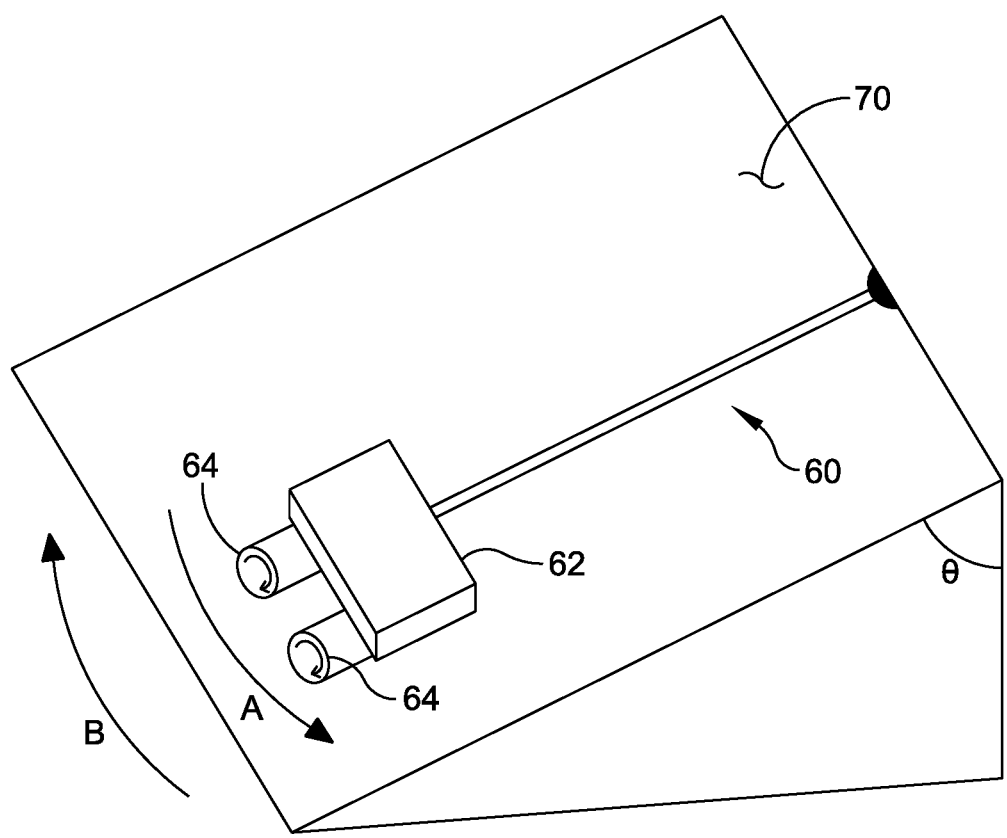
FIG. 3 depicts a variant of the pendulum of the present invention in which the pendulum bob has rollers.

As shown in FIG. 3, a variant of the present invention is a pendulum 60 with a pendulum bob 62 having Teflon rollers 64 to contact an inclined plane 70 with a Teflon surface. The use of the Teflon rollers 64 on the inclined plane 70 benefits from reduced friction as the pendulum bob 62 moves along the inclined plane.

Alternatively, the mass of the pendulum bob 12 or the pendulum bob 62 can be adjusted to reduce friction since the resonant frequency of the pendulum is independent of the mass of the pendulum bob. The mass adjustment is accomplished simply by changing the mass of the pendulum bob. The friction force is $F_f=\mu N$, where $\mu$ is the coefficient of friction, $N=mg\sin\theta$ is the force normal to the surface, m is the mass of the pendulum bob, and g=9.81 m/s². By using these calculations, the pendulum bob 12 and the pendulum bob 62 can be replaced with a larger or smaller bob.

An advantage of the pendulum of the present invention is the ability to harvest resonant energy of ocean waves in a compact package. The compact energy harvesting package can be used to support a wide range of applications including unmanned vehicles. Power from the energy harvesting device can be used locally to charge an unmanned underwater vehicle.

An alternative energy harvesting device would be a spring-mass system moving on an inclined plane or even a horizontal plane. This design of energy harvesting device could enable resonant operations at a low frequency without the large static deflections of the spring element that would result in a large length scale. However, when the inclined plane undergoes roll and pitch motion due to wave action; the effective static deflection could significantly increase at the larger roll/pitch angles (due to a larger component of the weight vector acting along the spring). In contrast, a pendulum device would have a constant size regardless of the roll or the pitch angle.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A device for energy harvesting, said device comprising:
    an inclined plane;
    a pendulum having a pendulum bob at a first end of an arm and with a second end of said arm attached at a top edge of said inclined plane at a hinge of said pendulum wherein said pendulum bob and said arm extending from said hinge are capable of oscillating on said inclined plane in a semi-circular path in at least two directions with an angle of motion of the path being under thirty degrees; and
    an electrical production source on a side of said inclined plane opposite of said pendulum;
    wherein said pendulum is capable of oscillating on said on said inclined plane in response to wave motion on an ocean surface such that kinetic energy of said pendulum at said pendulum bob is converted to electrical energy by said electrical production source;
    wherein said electrical production source is a coil of wire capable of producing a magnetic field that said pendulum moves thru with the use of said pendulum bob as an electrical conductor.

2. The device in accordance with claim 1 wherein said inclined plane has a low-friction surface.

3. The device in accordance with claim 2 wherein said device is enclosed by an enclosure capable of floating on the ocean surface.

4. The device in accordance with claim 1 wherein said pendulum bob has rollers extending from a center of said pendulum bob wherein said rollers are capable of contacting said inclined plane to reduce friction as the pendulum bob moves along the inclined plane.

5. The device in accordance with claim 4 wherein said device is enclosed by an enclosure capable of floating on the ocean surface.

* * * * *